Figure 1:
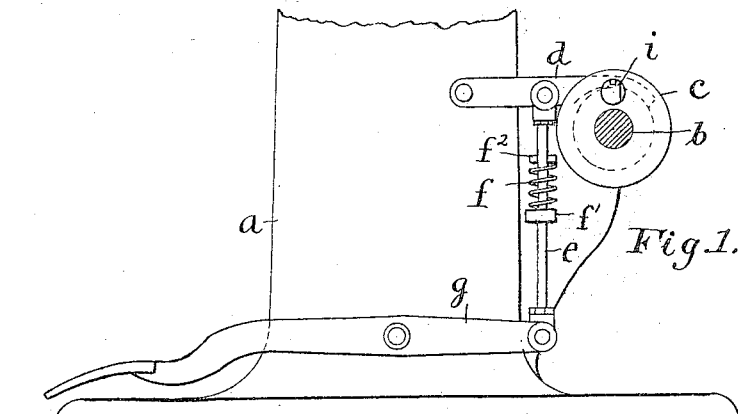

E. SOUTHWORTH.
CLUTCH MECHANISM FOR PUNCHING MACHINES.
APPLICATION FILED JUNE 18, 1909.

961,382.

Patented June 14, 1910.

Witnesses:
Lucy M. Andrews.
Eleanor W. Dennis.

Inventor:
Edward Southworth
by S. W. Bates
Atty.

UNITED STATES PATENT OFFICE.

EDWARD SOUTHWORTH, OF PORTLAND, MAINE.

CLUTCH MECHANISM FOR PUNCHING-MACHINES.

961,382.

Specification of Letters Patent. Patented June 14, 1910.

Application filed June 18, 1909. Serial No. 502,883.

*To all whom it may concern:*

Be it known that I, EDWARD SOUTHWORTH, a citizen of the United States of America, and resident of Portland, in the county of Cumberland, State of Maine, have invented certain new and useful Improvements in Clutch Mechanism for Punching-Machines, of which the following is a specification.

My invention relates particularly to clutch mechanism such as is used on punching machines and the like where it is desired to make a single revolution of the driving shaft, stopping automatically at the end of each revolution. The invention is, however, adapted to be used on clutch mechanism for automobiles or other uses where a clutch is thrown in engagement while the machine is in motion.

In the punching machines referred to, a clutch mechanism is used having a loose member which is usually a belt driven pulley and a fixed member secured to the driving shaft. The motion of the loose member is transmitted to the fixed member by means of a longitudinally movable bolt located in the fixed member and which is forced through mechanism controlled by a foot lever into the path of a shoulder on the loose member whereby the two clutch members are locked together. When one revolution is completed the bolt is automatically withdrawn, the parts are disengaged and the machine stops. The blow with which the shoulder on the loose member strikes the bolt is a severe one as it must be sufficient to instantly overcome the inertia of the machine to set the parts in motion and this blow is accompanied by a sharp noise which is very objectionable. Aside from the noise, the strain on the bolt and its adjacent parts is great and causes rapid wearing of the surfaces.

The object of my invention is to ease the shock on the clutch members when they are thrown into engagement for the purpose of abating the noise and lessening the strain on the machinery.

With this end in view I provide one of the engaging parts with a yielding support whereby the shock of the contact as the contacting surfaces come together is relieved and both the noise and the strain are abated. This result may be effected in a variety of ways but it is preferably carried out in the manner hereinafter shown and described.

In the accompanying drawing, I show a punching machine with one form of my invention although it is to be understood that the invention may be otherwise applied.

Figure 2:
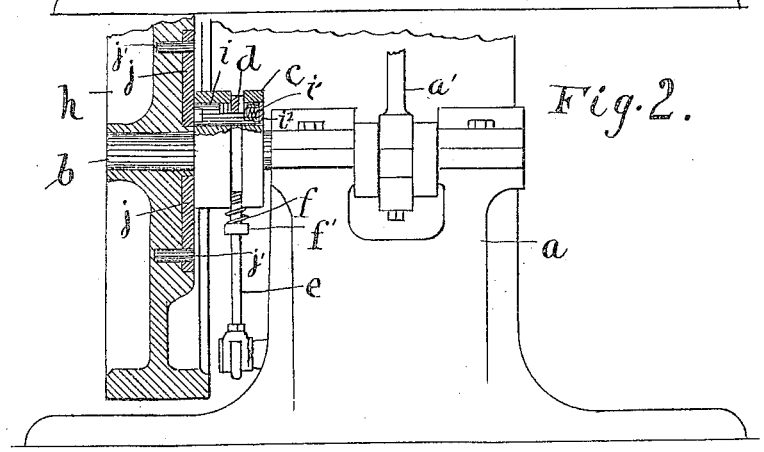
Figures 3, 4, 5:
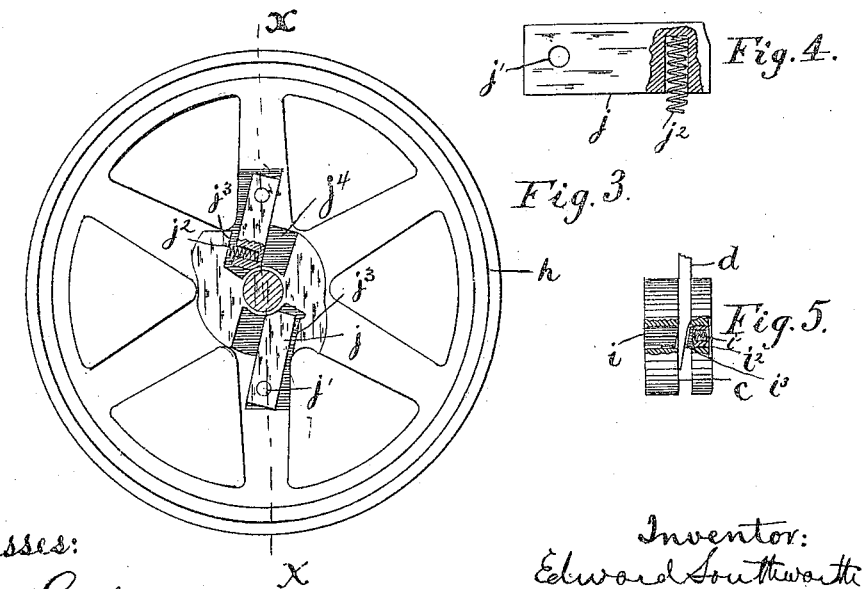

In the drawing, Figure 1 is a side elevation showing the clutch mechanism of the punching machine with the driving pulley or loose member removed, Fig. 2 is a rear elevation with the driving pulley and a portion of the fixed clutch member in section on the line $x\ x$ of Fig. 3, Fig. 3 is a face view of the driving pulley or loose clutch member, Fig. 4 is a detail of the contact block, and Fig. 5 is a detail showing the locking bolt in position.

$a$ represents the base of the punching machine, $b$ the driving shaft, $c$ the fixed clutch member which is secured on the shaft $b$ and formed with an annular groove, $i$ is the engaging bolt formed with an inclined recess $i^3$. The bolt $i$ contains in its rear end a coiled spring $i'$ which acts against a plate $i^2$ in the fixed clutch member and tends to force the bolt beyond the face of the member $c$. The bolt is automatically withdrawn at each revolution by means of a pivoted horizontal arm $d$ having a wedge shaped end which rests normally in the groove of the member $c$ and which enters the inclined recess $i^3$ and acts to withdraw the bolt each time it comes around. The arm $d$ is lifted to release the bolt by a foot lever $g$, connected to the arm $d$ by a link $e$ having a spring $f$ by which the arm is pressed normally downward. A stop $f'$ on the link and a stop $f^2$ on the machine serve to confine the spring. The parts thus far described are old and well known in such devices and constitute no part of my invention.

The loose clutch member as here shown consists of the driving pulley $h$ loosely turning on the shaft $b$ and adapted to be engaged with the member $c$ by means of the engaging bolt $i$. One of the contacting blocks which takes the strain when the parts are thrown into engagement is provided with a yielding support whereby it gradually gives way and so relieves the noise and the shock.

As herein described, the contact block in the loose member is pivoted and its free end is provided with a yielding support tending to resist the strain caused by the blow. As shown, I pivot at $j'$ in the body of the pulley $h$ two contact blocks $j$ made preferably of hardened steel and having a limited space in which to swing on the pivoting center. The blocks $j$ are as shown rectangular in form with the pivoted end away from the center of the pulley. Adjacent to the inner end of each block there is a shoulder $j^3$ formed on the body of the pulley against which shoulder the block strikes when it is displaced by contact with the bolt $i$. A space or recess $j^4$ is formed in the face of the pulley adjacent to the free end of the block and on the opposite side of the block from the shoulder $j^3$ and it is into this space $j^4$ that the end of the bolt projects as the pulley turns. The free end of the block is yieldingly supported against displacement by contact with the bolt $i$. As here shown, a hole is bored in the rear edge of each block adjacent to the shoulder $j^3$ and a spiral spring $j^2$ is inserted.

In the operation of the device, the bolt $i$ being drawn back and the shaft $b$ at rest, the foot lever is depressed, thus raising the arm $d$ and allowing the spring $i$ to force the bolt outward against the inner face of the pulley. As soon as one of the recesses $j^4$ reaches the bolt the latter springs out, its end entering the recess and it immediately comes in contact with the free end of the block $j$, forcing the latter against the shoulder $j^3$, the spring $j^2$ gradually yielding to the force of the blow. Thus the shock is relieved and the noise which usually accompanies the engaging of the clutch is largely done away with.

It is evident that the yielding support instead of being applied to the loose clutch member may be applied to the fixed clutch member or it may be applied to both if desired, the idea being to provide a yielding resistance in one or both members so as to avoid the excessive shock of engagement.

My invention may be applied to clutches used on other machines than punches where it is desired to avoid the noise and strain caused by the contact of the two parts.

I claim:—

1. In a clutch mechanism, the combination of a shaft, a loose clutch member and a fixed clutch member thereon, a longitudinally movable engaging bolt in the fixed clutch member, a pivoted contact block in the loose clutch member adapted to impinge on said bolt, a shoulder being formed on said loose clutch member adjacent to the free end of said contact block and a bearing spring interposed between said contact block and said shoulder.

2. In a clutch mechanism, the combination of a shaft, a loose clutch member and a fixed clutch member thereon, a longitudinally movable engaging bolt in the one clutch member, a pivoted contact block in the other clutch member adapted to impinge on said bolt, a shoulder being formed adjacent to the free end of said contact block and a bearing spring interposed between said contact block and said shoulder.

In witness whereof I have hereunto set my hand this 10th day of June, 1909.

EDWARD SOUTHWORTH.

Witnesses:
S. W. BATES,
ELEANOR W. DENNIS.